US 9,302,352 B2

(12) United States Patent
Hietland

(10) Patent No.: US 9,302,352 B2
(45) Date of Patent: Apr. 5, 2016

(54) LINE UP TOOL

(71) Applicant: Gerrithendrik Hietland, Grande Prairie (CA)

(72) Inventor: Gerrithendrik Hietland, Grande Prairie (CA)

( * ) Notice: Subject to any disclaimer, the term of this patent is extended or adjusted under 35 U.S.C. 154(b) by 268 days.

(21) Appl. No.: 14/055,907

(22) Filed: Oct. 17, 2013

(65) Prior Publication Data

US 2014/0109368 A1 Apr. 24, 2014

Related U.S. Application Data

(60) Provisional application No. 61/715,919, filed on Oct. 19, 2012.

(30) Foreign Application Priority Data

Jul. 12, 2013 (CA) .................................. 2820727

(51) Int. Cl.
*B23K 37/053* (2006.01)

(52) U.S. Cl.
CPC ........... *B23K 37/053* (2013.01); *B23K 37/0533* (2013.01); *B23K 37/0536* (2013.01); *Y10T 29/53913* (2015.01)

(58) Field of Classification Search
CPC .... B23K 37/053; B23K 37/0533; B24B 5/14; B24B 5/147; B24B 27/16; B24B 27/12; F16L 1/10; F16L 13/20; F16L 13/02
USPC .................................................. 29/271, 272
See application file for complete search history.

(56) References Cited

U.S. PATENT DOCUMENTS

| 3,653,574 | A | * | 4/1972 | Dearman | B23K 37/053 228/49.1 |
|---|---|---|---|---|---|
| 3,952,936 | A | * | 4/1976 | Dearman | F16L 13/02 228/49.3 |
| 6,058,588 | A | * | 5/2000 | Wadensten | B25B 27/14 29/256 |
| 6,651,967 | B1 | | 11/2003 | Barber | |
| 7,120,983 | B2 | * | 10/2006 | Jarema | B23Q 3/18 29/406 |
| 8,850,679 | B2 | * | 10/2014 | Bender | B25B 5/147 269/43 |
| 2014/0283359 | A1 | * | 9/2014 | DePietro | E02D 29/12 29/466 |

* cited by examiner

*Primary Examiner* — Lee D Wilson
*Assistant Examiner* — Seahee Yoon
(74) *Attorney, Agent, or Firm* — Davis & Bujold PLLC; Michael J. Bujold

(57) ABSTRACT

A line up tool includes a one piece body having a main portion and a tongue portion. The tongue portion projects outwardly from the main portion defining a longitudinal axis. The main portion has at least one workpiece engaging face, a first side and a second side. A passage extends through the main portion perpendicular to the longitudinal axis from the first side to the second side. The passage is positioned and configured to receive a flexible clamping device which is used to clamp the at least one workpiece engaging face to a workpiece. The tongue has a first face, a second face, a first side and a second side. A threaded aperture extends through the tongue perpendicular to the longitudinal axis from the first face to the second face. A set screw engages the threaded aperture. The set screw has a three application end and a workpiece engaging end.

2 Claims, 1 Drawing Sheet

LINE UP TOOL

FIELD

There is described a line up tool developed for use by welders and fitters.

BACKGROUND

In order to weld pipe-to-pipe/fitting-to-fitting/fitting-to-pipe, all pieces need to be aligned within given specifications. There will hereinafter be described a line up tool for aligning pieces in preparation for welding.

SUMMARY

There is provided a line up tool which includes a one piece body having a main portion and a tongue portion. The tongue portion projects outwardly from the main portion defining a longitudinal axis. The main portion has at least one workpiece engaging face, a first side and a second side. A passage extends through the main portion perpendicular to the longitudinal axis from the first side to the second side. The passage is positioned and configured to receive a flexible clamping device which is used to clamp the at least one workpiece engaging face to a workpiece. The tongue has a first face, a second face, a first side and a second side. A threaded aperture extends through the tongue perpendicular to the longitudinal axis from the first face to the second face. A set screw engages the threaded aperture. The set screw has a three application end and a workpiece engaging end.

A number of line up tools, as described above, are attached to a first workpiece by a flexible clamping device, such as a chain or wire rope. The workpiece engaging end of the set screws of each of the line up tools are used to engage a second workpiece and hold it in position during welding.

Although beneficial results may be obtained through the use of a line up tool as described, the space available on the first workpiece varies. It is, therefore, preferred that the line up tool be "reversible". In accordance with this aspect, it is preferred that the main portion has a first workpiece engaging face of a first dimension and a second workpiece engaging face of a second dimension that is smaller than the first dimension. The workpiece engaging end of the set screw protrudes past the first face of the tongue when the first workpiece engaging face is used to engage a workpiece, and the workpiece engaging end of the set screw protrudes past the second face of the tongue when the second workpiece engaging face is used to engage the workpiece.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
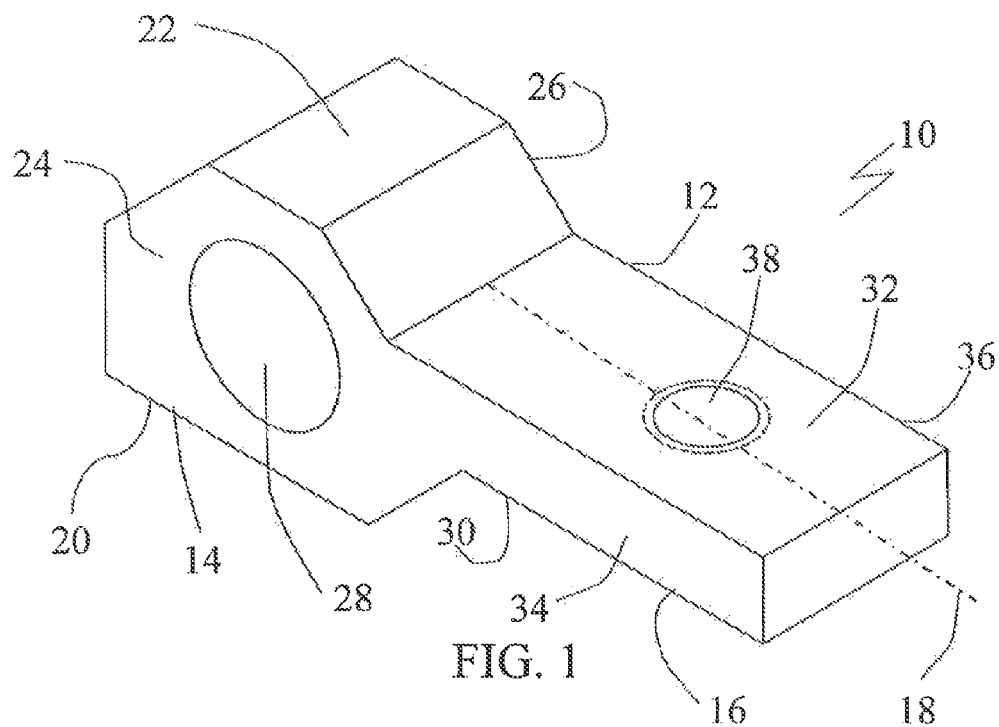
FIG. 1 is a perspective view of a line up tool.

A line up tool generally identified by reference numeral 10, will now be described with reference to FIG. 1 and FIG. 2.
Structure and Relationship of Parts:

Referring to FIG. 1, line up tool 10 includes a one piece body 12 having a main portion 14 and a tongue portion 16. Tongue portion 16 projects outwardly from main portion 14 defining a longitudinal axis 18.

Main portion 14 has a first workpiece engaging face 20, a second workpiece engaging face 22, a first side 24 and a second side 26. A passage 28 extends through main portion 14 perpendicular to longitudinal axis 18 from first side 24 to second side 26. Referring to FIG. 2, passage 28 is positioned and configured to receive a flexible clamping device, such as chain 100, which is used to clamp either first workpiece engaging face 20 or second workpiece engaging face 22 to a first workpiece 102. In the illustration, first workpiece 102 shown is a flange.

Referring to FIG. 1, tongue 16 has a first face 30, a second face 32, a first side 34 and a second side 36. A threaded aperture 38 extends through tongue 16 perpendicular to longitudinal axis 18 from first face 30 to the second face 32.

Figure 2:
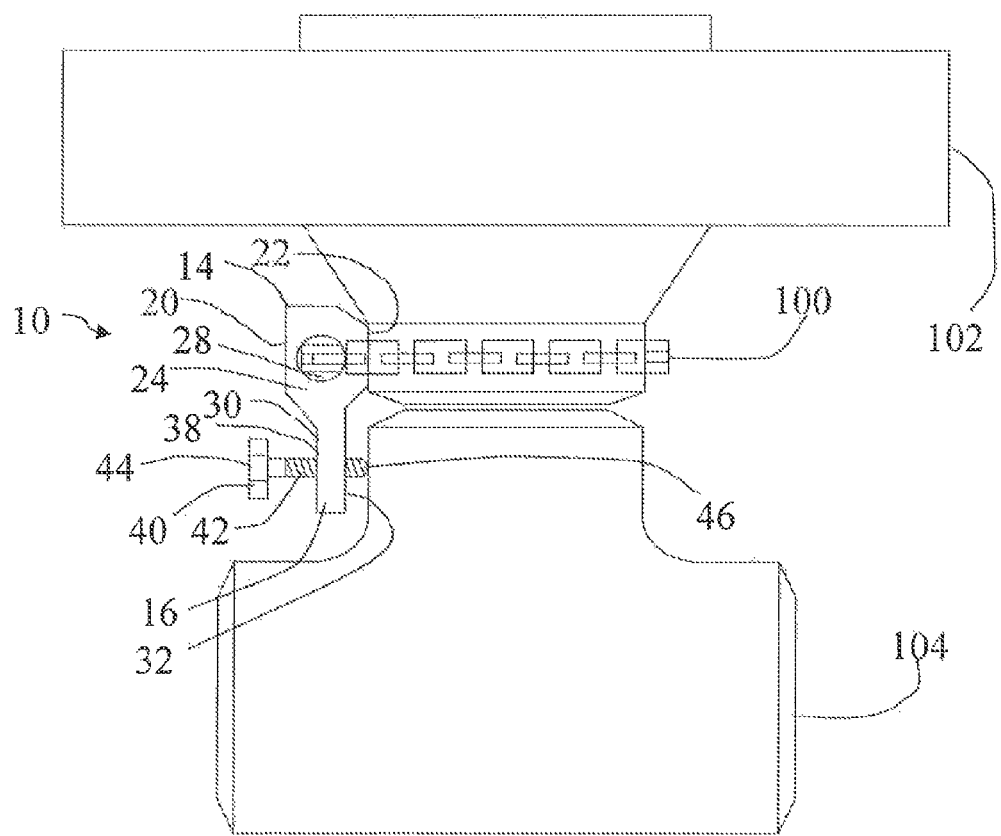
FIG. 2 is a side elevation view showing the line up tool illustrated in FIG. 1 being used to secure a flange and Tee fitting in position.

Referring to FIG. 2, a set screw 40 engages threaded aperture 38. Set screw 40 has a threaded shaft 42, a rotational force application end 44 and a workpiece engaging end 46. As described herein, a set screw is intended to include to any threaded rod that extends through aperture 38 to apply a force to workpiece 104 in order to adjust its relative position.

Operation:

Referring to FIG. 2, although a single line up tool 10 has been illustrated, it will be appreciated that a plurality of line up tools are placed around first workpiece 102 (a flange is illustrated). Line up tools 10 are held in position around first workpiece 102 by flexible clamping device, which in this instance is chain 100. Workpiece engaging end 46 of set screw 40 of each of line up tools 10 is then used to engage a second workpiece 104 to hold second workpiece 104 in position during welding. In the illustration a Tee fitting has been selected as second workpiece 104. It will be understood the workpiece engaging end 46 is extended into an engaging position by manual rotation of rotational force application end 44.

In view of the fact that space available for clamping on first workpiece 102 may vary, line up tool 10 has been made be "reversible". Line up tool 10 is made from steel and shaped to provide multi-function, reversible usage. In order to make line up tool 10 "reversible", main portion 14 has first workpiece engaging face 20 of a first dimension and second workpiece engaging face 22 of a second dimension that is smaller than the first dimension. Workpiece engaging end 46 of set screw 40 protrudes past first face 30 of tongue 16 when first workpiece engaging face 20 is used to engage first workpiece 102. Set screw 40 is reversed with workpiece engaging end 46 of set screw 40 protruding past second face 32 of tongue 16 when second workpiece engaging face 22 is used to engage first workpiece 102.

As described above, line up tool 10 clamps onto pipe or fitting with a 'chain vise grip'. For the fitting to be positioned in the correct place, line-up tool will sit on fittings where there is very limited space where other line-up tools will not fit. Second workpiece engaging face 22 will fit in places with limited space, for example: flange-to-tee, and first workpiece engaging face 20 will fit on all other applications. Set screws 40 are simply screwed in from the other side if the tool needs to be reversed. Tool will fit on all diameter pipes, up to approximately 12", depending on schedule. Tool is fabricated from mild steel with a ⅜" threaded hole for the set screw. The larger hole for chain grip is approximately 16 mm.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the claims should not be limited by the illustrated embodiments set forth as examples, but should be given the broadest interpretation consistent with a purposive construction of the claims in view of the description as a whole.

What is claimed is:

1. A line up tool, comprising:
    a one piece body having a first end, a second end, a main portion and a tongue, the main portion extending from the first end and the tongue projecting outwardly from the main portion to the second end, the one piece body defining a longitudinal axis that extends between the first end and the second end,
        wherein: the main portion has a first workpiece engaging face, a second workpiece engaging face, a first side and a second side, each of the first and the second workpiece engaging faces having first edges adjacent to the first end of the one piece body, the first edge of the second workpiece engaging face being spaced from the first end of the one piece body relative to the first edge of the first workpiece engaging face, the first workpiece engagement face has a first engagement area that is greater than a second engagement area of the second workpiece engagement face, the main portion has a passage extending through the main portion perpendicular to the longitudinal axis from the first side to the second side, the passage is positioned and configured to receive a flexible clamping device that is used to clamp the at least one workpiece engaging face to a workpiece;
        the tongue having a first face, a second face, a first side and a second side, a threaded aperture extending through the tongue perpendicular to the longitudinal axis from the first face to the second face, the first face being spaced from the first workpiece engaging face of the main portion toward the second workpiece engaging face and the second face being spaced from the second workpiece engaging face of the main portion toward the first workpiece engaging face; and
    a set screw engaging the threaded aperture, the set screw having a force application end and a workpiece engaging end.

2. The line up tool as defined in claim 1, wherein the workpiece engaging end of the set screw protruding past the first face of the tongue when the first workpiece engaging face is used to engage a workpiece, and the workpiece engaging end of the set screw protruding past the second face of the tongue when the second workpiece engaging face is used to engage the workpiece.

* * * * *